United States Patent
Choe et al.

(10) Patent No.: US 8,259,655 B2
(45) Date of Patent: Sep. 4, 2012

(54) MEDIUM ACCESS METHOD FOR CONTENTION AND NON-CONTENTION

(75) Inventors: Mi-Ra Choe, Suwon-si (KR); Chang-Woo Seo, Suwon-si (KR); Rae-Jin Uh, Seoul (KR); Sung-Guk Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1361 days.

(21) Appl. No.: 11/266,482

(22) Filed: Nov. 4, 2005

(65) Prior Publication Data

US 2006/0114878 A1 Jun. 1, 2006

(30) Foreign Application Priority Data

Nov. 26, 2004 (KR) .................. 10-2004-0098242

(51) Int. Cl.
*H04W 4/00* (2009.01)

(52) U.S. Cl. ...................................... 370/329; 370/449

(58) Field of Classification Search .................. 370/310, 370/310.2, 312, 314, 319, 320, 321, 322, 370/328, 329, 330, 335, 336, 337
See application file for complete search history.

(56) References Cited

U.S. PATENT DOCUMENTS

| | | | | |
|---|---|---|---|---|
| 7,352,770 | B1 * | 4/2008 | Yonge et al. | 370/445 |
| 7,830,856 | B2 * | 11/2010 | Boetzel et al. | 370/345 |
| 2002/0071448 | A1 * | 6/2002 | Cervello et al. | 370/445 |

(Continued)

FOREIGN PATENT DOCUMENTS

CN 1406029 3/2003

(Continued)

OTHER PUBLICATIONS

XP002420421, *Samsung MAC Proposal Technical Specification*, published on Aug. 13, 2004.

(Continued)

*Primary Examiner* — Andrew Lai
*Assistant Examiner* — Juvena Loo
(74) *Attorney, Agent, or Firm* — H.C. Park & Associates, PLC

(57) ABSTRACT

In a medium access method for contention and non-contention, a poll number for stations, or wireless terminals for communication, is managed by a base station so as to guarantee smooth traffic and improved Quality of Service (QoS). A first group of stations is provided for the non-contention, and a second group of stations is provided for the contention. The method includes (a) preparing a contention-free access message attempting access of the first group, (b) detecting a transmission time of a contention access message attempting access of the second group, (c) embedding the contention-free access message in the contention access message so as to transmit the embedded message to at least one of the first and second groups, and (d) receiving the contention access message, in which the contention-free access message is embedded, at the at least one of the first and second groups, and endowing any one of the first and second groups with a priority to attempt access to a medium in turn. Thereby, a poll number control-based multi-polling distributed coordination function (MP-DCF) mechanism is shared with the commercial stations to which no MP-DCF module is provided, so that it is possible to solve a drawback in that all stations should have the MP-DCF module provided therein, as well as to constantly maintain throughput even though the number of stations is gradually increased.

5 Claims, 3 Drawing Sheets

U.S. PATENT DOCUMENTS

| | | | |
|---|---|---|---|
| 2002/0122409 A1* | 9/2002 | Kandala | 370/348 |
| 2002/0159418 A1 | 10/2002 | Rudnick et al. | |
| 2003/0053480 A1* | 3/2003 | Jang et al. | 370/445 |
| 2003/0152059 A1* | 8/2003 | Odman | 370/338 |
| 2004/0022219 A1* | 2/2004 | Mangold et al. | 370/336 |
| 2004/0142695 A1* | 7/2004 | O'Neill et al. | 455/450 |
| 2004/0253996 A1* | 12/2004 | Chen et al. | 455/574 |

FOREIGN PATENT DOCUMENTS

| | | | |
|---|---|---|---|
| GB | 2391137 A | * | 1/2004 |
| KR | 10-0442821 | | 3/2003 |
| KR | 2003-0025417 | | 3/2003 |
| WO | WO 02/41590 | | 5/2002 |
| WO | PCT/IB03/00829 | * | 3/2003 |
| WO | WO 03/075514 | | 9/2003 |

OTHER PUBLICATIONS

IEEE Computer Society, "IEEE Standard for Information Technology—Telecommunications and information exchange between systems—Local and metropolitan area networks—Specific requirements, Part 11: Wireless LAN Medium Access Control (MAC) and Physical Layer (PHY) Specifications", IEEE Std 802.11, Jun. 12, 2007, pp. 1-724.

* cited by examiner

MEDIUM ACCESS METHOD FOR CONTENTION AND NON-CONTENTION

CLAIM OF PRIORITY

This application makes reference to, incorporates the same herein, and claims all benefits accruing under 35 U.S.C. §119 from an application for MEDIUM ACCESS METHOD FOR CONTENTION AND NON-CONTENTION earlier filed in the Korean Intellectual Property Office on 26 Nov. 2004 and there duly assigned Serial No. 2004-98242.

BACKGROUND OF THE INVENTION

1. Technical Field

The present invention relates to a medium access method for contention and non-contention and, more particularly, to a medium access method for contention and non-contention, in which a poll number for commercial stations (wireless stations for communication) is managed by a base station according to the IEEE 802.11e standard, thereby guaranteeing smooth traffic and improved Quality of Service (QoS).

2. Related Art

In general, a wireless local area network (LAN) is a mechanism for performing communication on a network by use of radio waves rather than cables. The wireless LAN was formed as an alternative for solving various difficulties in installation, maintenance or repair, mobility and so forth which are caused by cabling, and a solution to those difficulties has become more of a necessity due to an increase in the number of users.

The wireless LAN consists of an access point (hereinafter, referred to as "AP") and a wireless station. The AP is equipment for sending radio waves to enable users of the wireless LAN, within a transmission distance to get access to the Internet, to use the network. The AP serves as a base station for a mobile phone or as the hub for a wired network. For example equipment called "AP" (or network interface toll center) has been already installed within a service area for wireless high-speed Internet service provided by an Internet Service Provider (ISP).

The wireless station should be provided with a wireless LAN card or the like in order to perform wireless network communication, and includes a PC or Personal Computer (inclusive of a notebook computer), a Personal Digital Assistant or PDA, and so forth.

However, currently, a study is being actively conducted in order to accommodate various services demanding real-time characteristics, such as voice communication services, multilateral video conference services, real-time image transmission services, and so forth. Thus, wireless LAN telephones are currently commercialized, and they enable anyone having access to the wireless LAN to make and receive calls.

The wireless LAN should be capable of guaranteeing QoS to stations or users using such services so as to smoothly provide various application services requiring the real-time characteristics. Further, since each of the stations connected to the wireless LAN makes a request for a different level of service, the wireless LAN should be capable of providing optimal services to the respective stations as well.

Standards for the wireless LAN which are presently used widely have an imminent function capable of guaranteeing QoS or Class of Service (CoS), or have a procedure for compensating related functions. The wireless LAN standard of the Institute of Electrical and Electronics Engineers (IEEE), which is widely applied to various countries including North America and Korea, supports a Point Coordination Function (PCF) as an option in order to make it possible to transmit real-time information, wherein the PCF refers to a medium access control function according to a polling mechanism.

The wireless LAN standard of IEEE follows "Standard for Information Technology-Telecommunications and Information Exchange between Systems-Local and Metropolitan Area Networks-Specific Requirements-part 11: Wireless LAN Medium Access Control (MAC) and Physical Layer (PHY) Specifications," 1999 Edition.

Hereinafter, the wireless LAN standard of IEEE is referred to, in short, as the IEEE 802.11 standard. This standard defines the media access control (MAC) and physical (PHY) layers for the wireless LAN.

The MAC layer defines orders and rules which a station or apparatus using the shared medium must observe in the use or access of the shared medium, thereby adjusting use of a capacity of the network and determining which of the stations is allowed to use the medium for transmission.

A MAC protocol includes an enhanced distributed coordination function (EDCF) for providing distributed coordination function (DCF) and QoS, and a hybrid coordination function (HCF) for providing point coordination function (PCF) and QoS. The DCF serves to transmit a MAC Protocol Data Unit (MPDU) through contention, wherein a period of transmitting the MPDU is called a contention period (CP). The PCF serves to transmit the MPDU through contention and polling, especially through polling, wherein the period of transmitting the MPDU is called a non-contention period, hereinafter referred to as a "contention-free period" or "CFP".

This DCF mechanism is an access control mechanism defined as a fundamental specification in the IEEE 802.11 standard, which provides authority to allow one of a plurality of stations to access a medium through contention according to a contention-based algorithm known as Carrier Sense Multiple Access/Collision Avoidance (CSMA/CA). In the station that does not gain access to the medium, a Network Allocation Vector (NAV) is set to be in a standby state.

Here, the NAV is provided through detection of a virtual carrier. Most of IEEE 802.11 frames include a duration field, which is used in reserving the medium for a fixed time. The NAV is a timer representing time information when the medium is reserved. Any one of the stations forces an expected time for use of the medium, including all the frames needed to complete current operation, to be set for the NAV, and other stations wait for the NAV to stand at 0 (null). If the NAV does not stand at 0 (null), the virtual carrier detection indicates that the medium is in use or busy. By contrast, if the NAV stands at 0 (null), the virtual carrier detection indicates that the medium is available. This NAV can be set by Request to Send (RTS), Clear to Send (CTS), and Acknowledgment (ACK) which are used to exchange the frames. In general, information capable of setting the NAV is transmitted, in addition to a header of the RTS or CTS frame.

As to the DCF mechanism, when any one of the stations is accessed within the CP through contention between the stations, other stations are delayed in getting access to the medium by the NAV time. After the NAV time, any one of the other stations gains an access chance through contention between the other stations.

In other words, the station checks whether the medium is busy or not. If so, the station waits for a predetermined time. After the predetermined time, if the medium is not busy, i.e. idle, the station decreases a backoff time. In this manner, the predetermined time for which each of the stations waits in order to initiate a traffic is called an InterFrame Space (IFS). There are three IFSs for the MAC protocol traffic: DIFS referring to a DCF interframe space, PIFS referring to a PCF interframe space, and SIFS referring to a short interframe space.

Before transmitting the frame, the station employing the DCF mechanism determines whether the medium is busy. If the medium is idle for a time longer than or equal to the DIFS, the station can transmit the frame. By contrast, if the medium is busy, the station initiates the backoff procedure. Then, when the backoff timer has a value of 0 (null), the station occupies the medium to transmit the frame.

However, because the DCF mechanism is based on acquisition of a transmission chance caused by a probability of getting access to the medium through contention between the stations, it is not easy to support services restricted by time. Further, when the number of stations is gradually increased, this interferes with services such as multimedia services where throughput should be constantly maintained. In addition, overhead is generated within a preset beacon interval to make it impossible to guarantee the QoS.

In the wireless LAN, the QoS is guaranteed by a contention-free medium access method, which is a representative polling-based mechanism, and the PCF uses this method. According to the single polling mechanism by the PCF or HCF, a plurality of stations can be connected to the AP without contention through the medium. In other words, when a single poll is generated from the AP toward the plurality of stations, a preset one of the stations is connected. Then, when the next single poll is generated, one of the other stations which are on standby with the first priority is connected.

However, the poll (or polling message) should be sent whenever the stations are polled, and there are portions of performing separate timing management for the CFP. For these reasons, there is a problem in that it is complicated in realization.

Meanwhile, technology related to a multi-polling DCF mechanism for overcoming disadvantages of the single polling mechanism by the PCF using basic functions of the DCF is disclosed in Korean Patent Registration Publication No. 10-0442821 (filed on Jul. 23, 2004 and titled "Data Communication Method based on Backoff Number Control").

As to the multi-polling DCF mechanism disclosed in the prior patent, when a multi-polling message, which includes information on identifiers (IDs) of stations intended for polling and on arbitrary backoff numbers allocated to the respective stations, is transmitted from an AP, the corresponding station receives the multi-polling message so as to set the backoff number allocated thereto in a backoff timer thereof, and subsequently performs a backoff procedure to attempt to get access to a medium. At this time, the station is on a polling list according to the multi-polling message, and has authority to get access to the medium on the basis of information on the backoff number.

In this manner, the multi-polling DCF mechanism transmits one polling message defining the backoff numbers of the corresponding stations to a plurality of stations requiring the QoS (hereinafter, referred to as "MP-DCF stations") by use of a multi-poll or a beacon, thereby making it possible to equally endow each of the MP-DCF stations with a transmission chance.

However, in the MP-DCF used as a polling-based medium access control mechanism for guaranteeing the QoS as set forth above, there are problems to be solved with respect to access to the medium.

First, in the medium access mechanism, such as the MP-DCF mechanism, only the MP-DCF stations are equally provided with a transmission chance on the basis of non-contention, but commercial stations employing the medium access mechanism, such as the DCF mechanism, are not provided with a transmission chance on the basis of contention. For this reason, the MP-DCF medium access mechanism does not allow commercial stations to coexist on the basis of the non-contention.

Further, the commercial stations cannot recognize the multi-polling message and provide a chance to get access to the medium at an interval of the DIFS between the data, so that the medium access of the MP-DCF stations cannot be guaranteed for the CFP due to interference with the commercial stations.

Therefore, when the MP-DCF stations coexist with the commercial stations, a collision phenomenon occurs because these two kinds of stations attempt to get first access to the medium. As such, the probability of failure to get access to the medium is increased, so that it is difficult to guarantee QoS.

SUMMARY OF THE INVENTION

It is, therefore, an objective of the present invention to provide a medium access method for contention and non-contention, capable of sharing a poll number control-based MP-DCF mechanism with the commercial stations in which no MP-DCF module is provided, and of distinguishing between the commercial stations and the MP-DCF mechanism-based stations, as well as between the AP and the stations without mutual interference, to thereby guarantee QoS.

In order to accomplish this objective, according to one aspect of the present invention, there is provided a medium access method for contention and non-contention, in which a first group has a plurality of stations for non-contention and a second group has a plurality of stations for contention. The medium access method comprises (a) preparing a contention-free access message attempting access of the first group, (b) detecting a transmission time of a contention access message attempting access of the second group, (c) embedding the contention-free access message in the contention access message to transmit the embedded message to at least one of the first and second groups, and (d) receiving the contention access message embedded with the contention-free access message at the at least one of the first and second groups, and endowing any one of the first and second groups with a priority in attempting access to a medium in turn.

The contention-free access message, preferably, has an access schedule, and is formed of a multi-polling message for causing the stations of the first group to attempt sequential access according to the access schedule. Preferably, the access schedule sets a backoff rank for getting access for each of the stations, and has a backoff time value depending on the backoff rank.

Further, it is preferable that the contention access message be formed of a beacon message for attempting contention access, and that the beacon message secure a contention period exclusive of a contention-free period based on the contention-free access message.

Meanwhile, it is preferable that, when the first group has the priority in step (d), the first group get access to the medium according to access scheduling within a contention-free period, and that the second group have a network allocation vector set for the contention-free period so as to maintain a standby state, and attempt medium access within a contention period subsequent to the standby state.

Further, preferably, the contention-free period includes a first period for sequentially uploading data of the stations of the first group to an access point, and a second period for sequentially downloading data corresponding to the uploaded data to each of the stations generating the uploaded data.

It is also preferable that, when the second group has the priority in step (d), the medium access method further comprise setting a network allocation vector for the first group to maintain a standby state for a contention period of the second group, and setting the network allocation vector for the second group to maintain the standby state for a contention-free period of attempting sequential medium access according to an access schedule after the standby state.

In order to accomplish this objective, according to another aspect of the present invention, there is provided a medium access method for contention and non-contention between at least one of a first group and a second group, and an access point, in which the first group has at least one station for getting access to a medium without contention, and the second group has at least one station for getting access to the medium through contention. The medium access method comprises (a) receiving a beacon message embedded with a multi-polling message at the first and second groups, (b) setting a network allocation vector by the first and second groups themselves receiving the beacon message, (c) removing the network allocation vector of the first group stored with a polling list in the first and second groups for which the network allocation vector is set, (d) determining whether data to be transmitted from each of the stations of the first group removing the network allocation vector are present, (e) uploading the data to the access point in turn according to an access schedule of the multi-polling message by the stations having the data, (f) maintaining a standby state for a contention-free period by the stations of the second group themselves from which the network allocation vector is not removed, (g) receiving a contention-free end signal after the contention-free period to remove the network allocation vector, and (h) transmitting and receiving data to and from the AP in a contention mechanism by the stations of the second group removing the network allocation vector.

Further, it is preferable that the medium access method further comprise downloading data of the access point corresponding to the uploaded data to each of the stations of the first group in turn after the stations of the first group upload the data to the access point.

Further, it is preferable that the medium access method further comprise setting a minimum value of a random contention window as a value of a number of poll to wait for the next beacon message when the data to be transmitted from at least one of the stations of the first group are not present.

With respect to the above method, step (f) includes: determining whether at least one of the stations of the second group is on standby in order to acquire a transmission chance; when on standby, causing a value of a backoff number, to which a rank decided through the contention is being decreased, to be increased up to a current backoff number so as to thereby maintain the standby state; and, when not on standby, setting a minimum value of a random contention window as a value of a number of a poll so as to wait for the next beacon message.

In order to accomplish this objective, according to yet another aspect of the present invention, there is provided a medium access method for contention and non-contention, wherein there is provided a superframe in which any one of a contention-free period, in which a first group having at least one station gets access to an access point without contention, and a contention period, in which a second group having at least one station gets access to the access point with contention, is formed as a first half, and the other is formed as a second half. The medium access method comprises (a) uploading data to the access point in turn at each of the stations of the first group for a first period of the contention-free period, and (b) downloading data corresponding to the uploaded data to each of the stations of the first group at the access point in turn for a second period of the contention-free period.

In order to accomplish this objective, according to still yet another aspect of the present invention, there is provided a medium access method for contention and non-contention, in which an access point and at least one station for contention and non-contention to get access to a medium are provided. The medium access method comprises (a) transmitting a beacon message embedded with a multi-polling message, (b) providing a contention-free period for uploading and downloading data between the access point and the at least one station getting access to the medium according to the multi-polling message of the beacon message, and (c) providing a contention period for uploading and downloading the data between the access point and the at least one station getting access to the medium according to the multi-polling message of the beacon message.

Further, it is preferable that step (b) include uploading the data to the access point in turn at all of the stations for a first period of the contention-free period, and downloading the data corresponding to the uploaded data to each of the stations at the access point in turn for a second period of the contention-free period.

Further, the multi-polling message, preferably, includes an access schedule for getting access to the access point, wherein the access schedule is allocated to each of the stations.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

A medium access method for contention and non-contention according to the present invention will now be described more fully with reference to the accompanying drawings.

Figure 1:
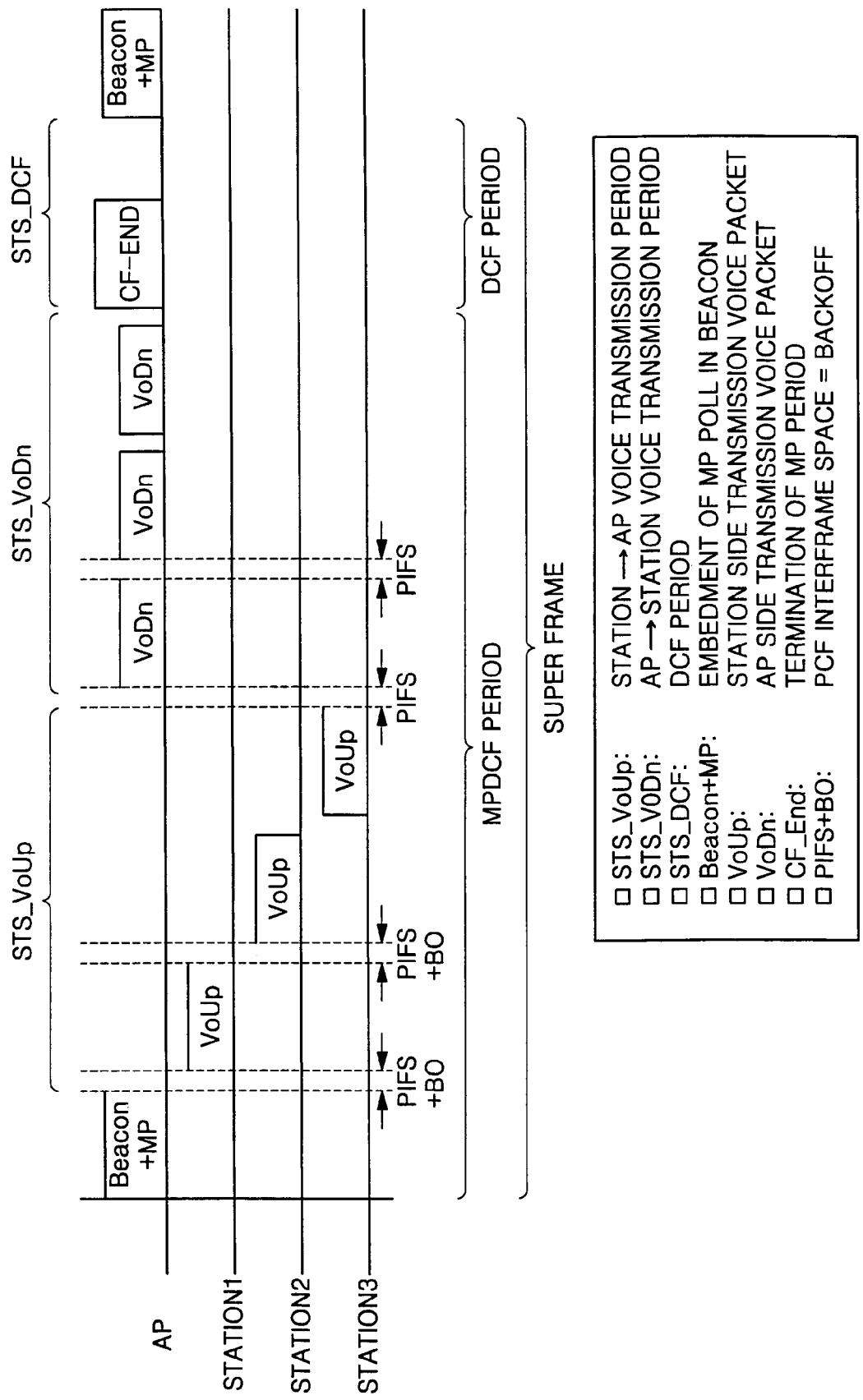
FIG. 1 shows a superframe having a contention period and a contention-free period in accordance with the present invention.

The medium access method for contention and non-contention is as shown in FIG. 1, which shows a superframe having a contention period and a contention-free period in accordance with the present invention.

To begin with, there are provided a plurality of stations and an AP for broadcasting to these stations so as to satisfy a contention base and a non-contention base at the same time, and so as to allow communication modes for these contention bases to mutually coexist. The plurality of stations may be classified into a first group having stations for non-contention and a second group having stations for contention.

Medium access between the first or second group and the AP is carried out within a superframe. The superframe is made up of a non-contention (or contention-free) period, i.e., a multi-polling distributed coordination function (MP-DCF) period for providing a polling message, a poll, to a plurality of arbitrary stations at the AP, and for allowing only the stations receiving the poll to get access to a medium without contention, and a contention period, i.e., a DCF period, for allowing the stations to get access to the medium through contention. The superframe provides a frame period between a beacon of a certain period and a beacon of the next period.

In the CFP of the superframe, a contention-free access message (hereinafter, referred to as a "multi-polling message") is prepared so as to allow the first group to get access to the medium without contention. The multi-polling message is embedded in a contention access message (hereinafter, referred to as a "beacon message") so as to allow the second group to get access to the medium through contention. These messages are transmitted to the first and second groups, respectively, to induce medium access by means of contention and non-contention. Access scheduling is carried out in such a manner that the first group performs a mode of transmitting data which each of the stations stores in the AP, and that the AP performs a mode of transmitting data which the AP stores in each station.

Figure 4:
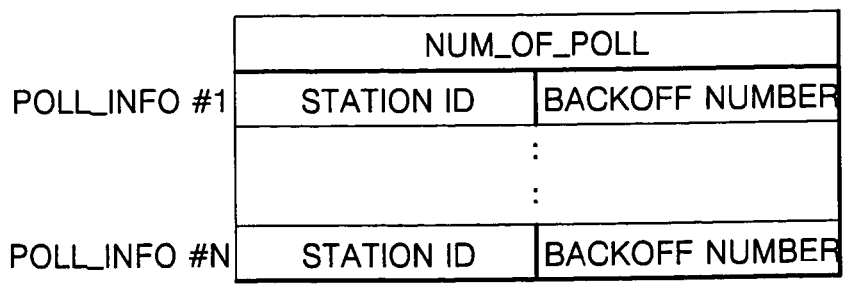
FIG. 4 shows a multi-polling message.

As shown in FIG. 4, which shows a multi-polling message, the multi-polling message consists of an access schedule having a Num_of_Poll field (i.e., a field for the number of polls) indicating the total number of the stations to be polled through the multi-polling message, identifiers (IDs) of the stations to be polled, and a backoff time value, i.e. a backoff number, setting orders of the IDs. Each of the poll numbers has a value ranging from 0 (zero) to N−1, wherein N is the number of polls.

For the sake of convenience, a period in which the multi-polling message is embedded in the beacon message for the CFP and transmitted to the first and second groups at the AP will be called a "beacon period." A period in which the first group performs the mode of transmitting the data which each station of the first group stores in the AP will be called a "first period." Finally, a period in which the AP performs the mode of transmitting the data which the AP stores in each station of the first group will be called a "second period."

In addition, the first period will be called an "upload period STS_VoUp," and the second period will be called a "download period STS_VoDn."

Furthermore, the CFP refers to a temporal period between a point in time when the beacon message is generated and a point in time when a contention-free or non-contention end signal CF END is generated, and the contention period refers to a temporal period between the point in time when the contention-free end signal CF END is generated and a point in time when the next beacon message is generated.

The CFP, in which access to the medium is provided without contention, is composed of the upload and download periods exclusive of the beacon period. The upload period is a period in which each station of the first group receiving the polling message completes transmitting the data, which each station stores, to the AP without contention in turn on the basis of a polling schedule. The download period is a period in which the AP completes transmitting the data of the AP, which correspond to the data of each station, to each station without contention in turn on the basis of the polling schedule.

In this case, for the upload period, the stations receiving the polling message from the AP transmit the data, which each station stores, to the AP without contention on the basis of the access schedule of the polling message. Then, whenever the data of each station are received, the AP transmits an acknowledgment signal to each station in turn in response to the reception, thereby confirming the reception of the data.

For the download period, the AP transmits the data thereof, which correspond to the data of the station for the upload period, from a storage region thereof to each station on the basis of the polling schedule, and then, whenever the data of the AP are received, each station transmits an acknowledgment signal to the AP in turn in response to the reception, thereby confirming the reception of the data.

For the upload and download periods, each station transmits the acknowledgment signal to the AP whenever each station receives the data of the AP, and vice versa. Then, each station occupies the medium in order to transmit the data to the AP, and in order to give a right to occupy the medium back to the next station based on the polling schedule after completing the transmission of the data.

At this point, the AP should occupy the medium in order to transmit the acknowledgment signal with respect to the data received from each station, and each station should occupy the medium in order to transmit the acknowledgment signal to the AP with respect to the data received from the AP. To this end, the AP occupies the corresponding medium to transmit the acknowledgment signal to each station by use of a PCF InterFrame Space (PIFS) of InterFrame Spaces (IFS) and a backoff time for the upload period and of the PIFS of IFS.

Thus, when the upload and download periods are terminated, the schedule based on the multi-polling message is completed, and so the AP broadcasts the contention-free end signal CF END, which indicates that the CFP is terminated, to the stations of the first group having an MP-DCF module so that the stations can get access to and occupy the medium.

Meanwhile, for the CFP when each station of the first group as set forth above gets access to the medium according to the access schedule of the multi-polling message to perform uploading and downloading, each station of the second group has a Network Allocation Vector (NAV) set by using a PCF MaxDuration field specified in CF parameters, thus maintaining a standby state within a value of the NAV. In other words, the CFP in the first group may be referred to as an NAV period in the second group.

When each station of the second group receives the contention-free end signal CF END indicating that the CFP is terminated, the NAV set for each station is removed. The on-contention end signal CF END causes the AP to be converted into a contention mode attempting to get access to the medium through contention. A period between the on-contention end signal CF END and the next beacon message is called the contention period.

In the contention period, the stations of the second group transmit data to the AP in a DCF mechanism in order to attempt to get access to the medium through contention. To begin with, before transmitting the frame, the stations of the second group employing the DCF mechanism for the contention period determine whether the medium is busy. If the medium is idle for a time longer than or equal to the DIFS, the stations can transmit the frame. By contrast, if the medium is busy, the stations initiate either a backoff procedure or an NAV procedure. Then, it is not until a backoff timer has a value of 0 (null) that the station occupies the medium to transmit the frame.

Figure 2:
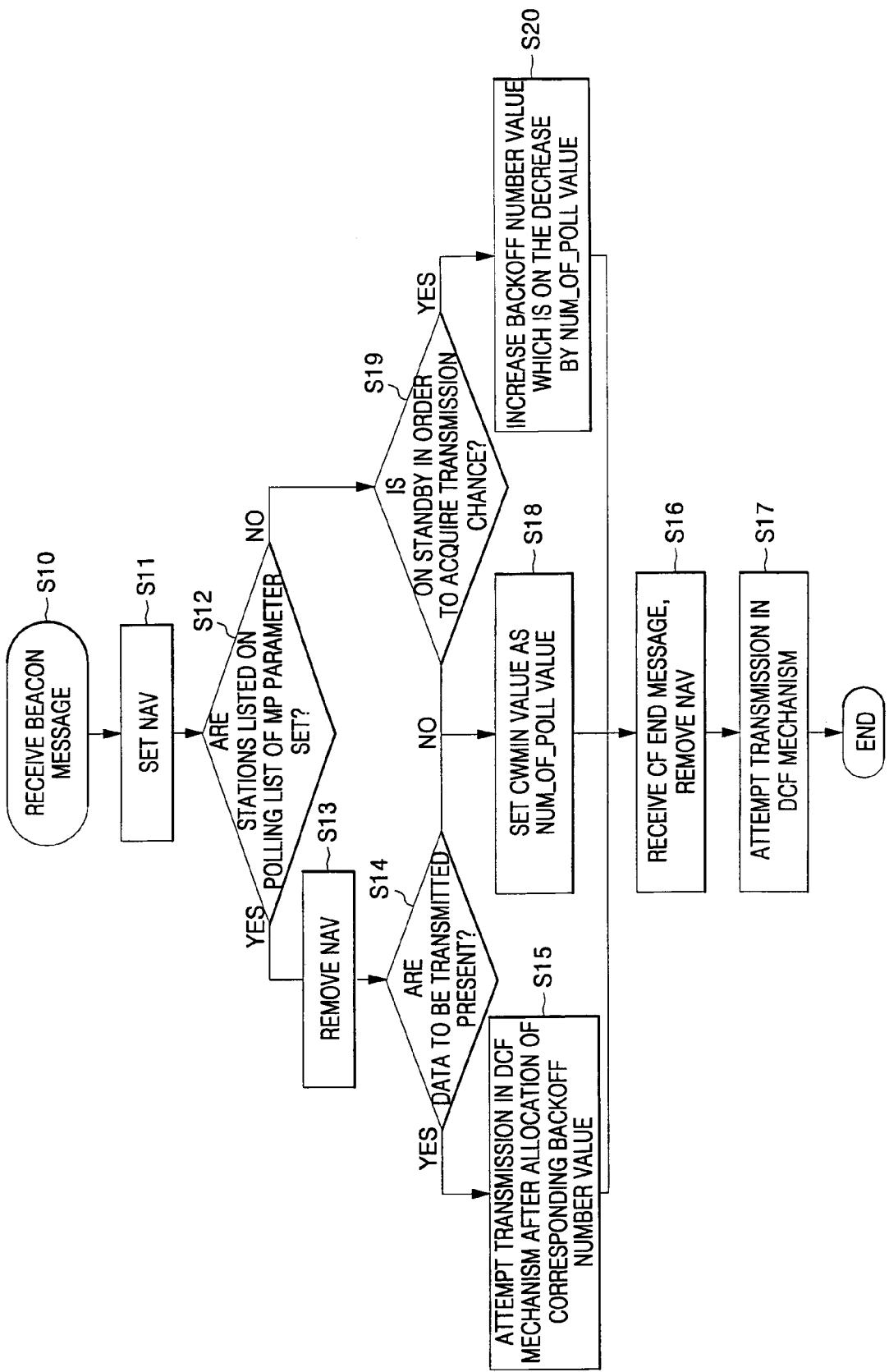
FIG. 2 is a flow chart showing medium access method for contention and non-contention in arbitrary stations in accordance with the present invention.

FIG. 2 is a flowchart showing medium access method for contention and non-contention in arbitrary stations in accordance with the present invention. The embodiment of the medium access method for contention and non-contention at the first and second groups of the present invention as mentioned above is as shown in FIG. 2.

First, medium access between at least one of a first group, having one or more stations for getting access to the medium without contention, and a second group, having one or more stations for getting access to the medium through contention, and the AP is performed in such a manner that, when the first and second groups receive the contention-free access message, (i.e. the beacon message into which the multi-polling message is embedded), the stations of the corresponding group perform an algorithm for getting access to the medium for the non-contention and contention periods of the superframe.

When the first and second groups receive the beacon message into which the multi-polling message is embedded from the AP (S10), each of the first and second groups itself set a value of the NAV to be in a standby state in order to differentiate between medium access for contention and non-contention (S11). The NAV is decided by a PCF MaxDuration field specified in CF parameters.

Each polling message transmitted from the AP can be received only by the stations listed on a polling list of a multi-polling (MP) parameter set. In other words, the polling message is received by each station of the first group getting access to the medium without contention (S12).

Because each station of the first group is established with a system capable of getting access to the medium without contention, when each station of the first group receives the polling message, each station of the first group itself removes the NAV, and thereby a CFP of a superframe is initiated (S13). The superframe provides a frame period between a beacon of a certain period and a beacon of the next period. A CFP is composed of a first period, wherein the first group transmits data which each station stores to the AP, and a second period, wherein the AP transmits data which the AP stores to each station of the first group. The first period is referred to as an upload period STS VoUp, and the second period is referred to as a download period STS VoDn.

Then, it is determined which of the stations of the first group gets access to the medium so as to have data to be transmitted for itself (S14). As a result of the determination, among the stations of the first group, at least one having data to be transmitted is subjected to upload and download of the data for the CFP (S15). For the upload period, each station of the first group receiving the polling message completes sequential transmission of the data which each station stores in the AP without contention according to an access schedule of the polling message. For the download period, the AP completes sequentially transmitting the data thereof, which data correspond to the data of the station, to each station without contention according to the access schedule of the polling message. At this point, from the stand of the individual station, when a value of a backoff number is allocated to become 0 (null), data are transmitted to the AP. The transmission is performed in the DCF mechanism.

When at least one of the stations of the first group gets access to the medium so as to have data transmitted, the at least one station sets a minimum value of random CW (Contention Window) as the value of the backoff number, and then maintains a standby state until the next beacon message is received (S18).

In this manner, when upload and download periods of the CFP are terminated, a schedule based on the multi-polling message is completed, and the AP broadcasts a contention-free end signal CF END, which indicates that the CFP is terminated, to the stations of the first group having an MP-DCF module so that the stations can get access to and occupy the medium. Each station of the second group getting access to the medium through contention receives the contention-free end signal CF END so as to remove an NAV set for itself (S16). When the NAV is removed, the contention-free end signal CF END causes the AP to be converted into a contention mode attempting to get access to the medium through contention.

Then, the stations of the second group transmit data to the AP in a DCF mechanism in order to attempt to get access to the medium through contention. Before transmitting a frame, the stations of the second group employing the DCF mechanism for the contention period first determine whether the medium is busy. If the medium is idle for a time longer than or equal to a DIFS, the stations can transmit the frame (S17).

Meanwhile, when each station of the second group cannot receive the polling message, that is, are not listed on a polling list, in step S12, it is determined whether at least one of the stations of the second group is waiting for medium access in order to acquire a transmission chance (S19). When at least one of the stations is waiting for medium access, the value of the backoff number, to which a rank decided through contention is being decreased, is increased up to the current backoff number, and a standby state is maintained until an NAV is removed (S20). Then, the stations of the second group perform medium access through contention on the basis of the contention-free end signal CF END in steps S16 and S17.

Figure 3:
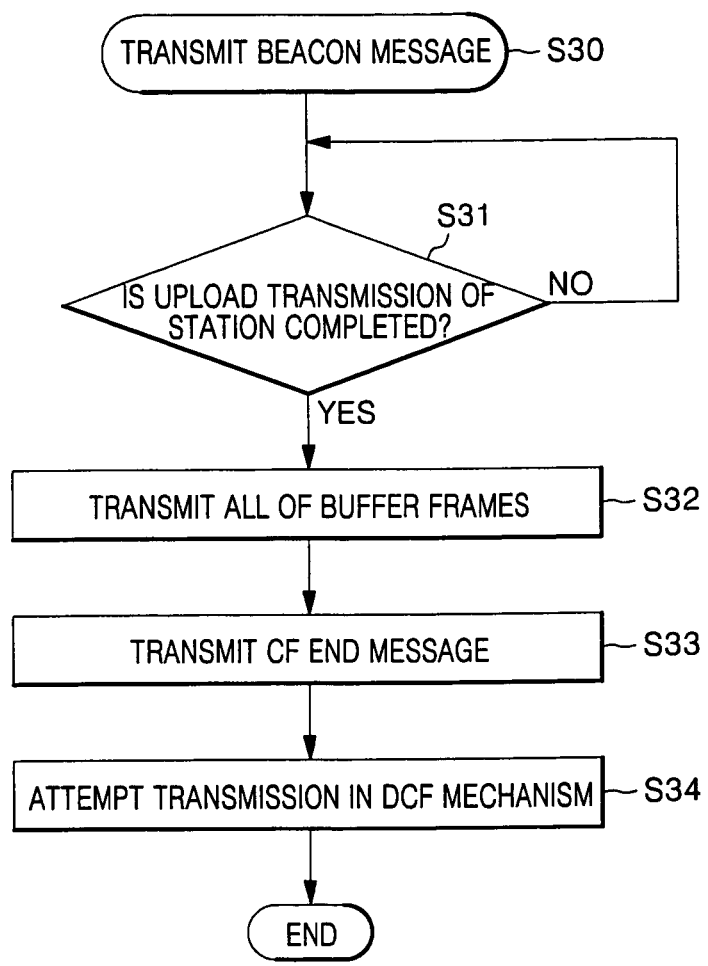
FIG. 3 is a flow chart showing a medium access method for contention and non-contention at an AP in accordance with the present invention.

FIG. 3 is a flow chart showing a medium access method for contention and non-contention at an AP in accordance with the present invention. The embodiment of the medium access method for contention and non-contention at the AP of the present invention as mentioned above is as shown in FIG. 3.

To begin with, the AP broadcasts a beacon message, in which a multi-polling message is embedded, to the first and second groups so as to get access to a medium with or without contention for a beacon period (S30).

Then, each station of the first group receiving the multi-polling message uploads data stored therein to the AP for an upload period of a CFP exclusive of the beacon period (S31), and downloads buffer frame data of the AP which correspond to the data of each station from the AP for a download period (S32). The upload and download modes are as mentioned above.

When the download is completed, the AP recognizes that work based on the CFP is completed, thereby transmitting a contention-free end signal CF END proposed from IEEE 802.11 in order to use the contention period based on the contention of the other stations (S33). Each station of the second group receiving the contention-free end signal CF END removes a NAV set for itself. Each station of the second group using the contention period based on the contention gets access to the medium by means of a contention mechanism of a DCF mode until the next beacon message is generated (S34).

The medium access method for contention and non-contention according to the present invention, as set forth above, is a scheme for sharing a MAC protocol poll number control based MP-DCF mechanism, which is based on IEEE 802.11, and a poll number control based MP-DCF mechanism, with the commercial stations. Those skilled in the art will appreciate that various modifications, additions and substitutions of the method are possible, without departing from the technical scope and spirit of the invention as disclosed in the accompanying claims.

The present invention can share the poll number control based MP-DCF mechanism with the commercial stations to which no MP-DCF module is provided, so that it has the effects of solving a drawback in that all of the stations should have the MP-DCF module provided therein, and of constantly maintaining the throughput, although the number of stations is gradually increased.

In addition, the commercial stations and the MP-DCF mechanism based stations, as well as the AP and the stations, are recognized by each other without mutual interference, so that it is possible to reduce the overhead of the multi-polling frame, thereby guaranteeing QoS.

Although preferred embodiments of the present invention have been described, it will be understood by those skilled in the art that the present invention should not be limited to the described preferred embodiments. Rather, various changes and modifications can be made within the spirit and scope of the present invention, as defined by the following claims.

What is claimed is:

1. A medium access method for contention and non-contention in a system comprising an access point, a first group of stations for accessing a medium without contention, and a second group of stations for accessing the medium through contention, the medium access method comprising:
   (a) preparing a contention-free access message for the first group;
   (b) detecting a transmission time of a contention access message for the second group;
   (c) embedding the contention-free access message in the contention access message to transmit the embedded message to the first group and the second group during the transmission time of the contention access message; and
   (d) receiving the contention access message with the embedded contention-free access message at the first group and the second group, and endowing one of the first group and the second group with a priority to attempt access to a medium,
   wherein, in response to endowing the first group with the priority in step (d), the first group accesses the medium according to access scheduling within the contention-free period, and the second group has a network allocation vector set for the contention-free period to maintain a standby state and the second group attempts to access the medium within a contention period subsequent to the standby state, and
   wherein the contention-free period comprises a first period for sequentially uploading data of the stations of the first group to an access point, and a second period for sequentially downloading data corresponding to the uploaded data to each of the stations generating the uploaded data.

2. The medium access method of claim 1, wherein the contention-free access message comprises an access schedule and the multi-polling message for causing the stations of the first group to attempt sequential access according to the access schedule.

3. The medium access method of claim 2, wherein the access schedule sets a backoff rank for getting access for each of the stations and has a backoff time value depending on the backoff rank.

4. The medium access method of claim 1, wherein the contention access message comprises the beacon message for attempting contention access, and the beacon message secures a contention period exclusive of the contention-free period, based on the contention-free access message.

5. The medium access method of claim 1, further comprising, in response to endowing the second group with the priority in the step (d), setting a network allocation vector for the first group to maintain a standby state for a contention period of the second group, and setting the network allocation vector for the second group to maintain the standby state for a contention-free period for attempting sequential medium access according to an access schedule after the standby state.

* * * * *